United States Patent [19]
Kötting et al.

[11] 3,815,334
[45] June 11, 1974

[54] GAS-LIQUID CONTACT DEVICE

[75] Inventors: Wolfgang Kötting, Koblenz; Erhard Zakrezewski, Nauort, both of Germany

[73] Assignee: Steuler Industriewerke GmbH, Hohr-Grenzhausen, Germany

[22] Filed: July 20, 1973

[21] Appl. No.: 381,259

Related U.S. Application Data
[63] Continuation of Ser. No. 132,417, April 8, 1971, abandoned.

[30] Foreign Application Priority Data
Apr. 10, 1970  Germany............................ 1571786

[52] U.S. Cl................ 55/227, 23/267 R, 55/71, 55/90, 55/93, 55/233, 261/19, 261/36 R, 261/111, 261/114 R, 423/488
[51] Int. Cl....................... B01d 47/00, C01b 7/08
[58] Field of Search ...... 423/240, 488; 23/261, 274, 23/275, 276, 267 R; 55/71, 73, 93, 227, 228, 233, 90; 159/4 A, 4 CC, DIG. 19; 202/155, 158; 203/98; 261/106, 111, 7, 8, 9, 19, 36 R, 113, 114 R, 117

[56] References Cited
UNITED STATES PATENTS

| | | | |
|---|---|---|---|
| 1,491,486 | 4/1924 | Marquard et al. | 159/4 A |
| 1,785,365 | 12/1930 | Seil | 55/73 |
| 2,093,895 | 9/1937 | Mosonnier et al. | 261/117 |
| 2,470,438 | 5/1949 | Jackson et al. | 55/227 |
| 2,560,978 | 7/1951 | Persson et al. | 261/113 |
| 2,858,903 | 11/1958 | Goetz et al. | 55/228 |
| 3,497,327 | 2/1970 | Kehse | 261/113 |
| 3,532,595 | 10/1970 | Arnes et al. | 55/73 |

FOREIGN PATENTS OR APPLICATIONS

| | | | |
|---|---|---|---|
| 1,082,426 | 12/1954 | France | 55/93 |

*Primary Examiner*—Frank W. Lutter
*Assistant Examiner*—Vincent Gifford
*Attorney, Agent, or Firm*—Norman S. Blodgett; Gerry A. Blodgett

[57] ABSTRACT

A gas scrubber wherein the gas is forced upwardly in a column containing a series of scrubbing trays, the trays being supplied from and draining to separate sorbtion medium containers.

1 Claim, 1 Drawing Figure

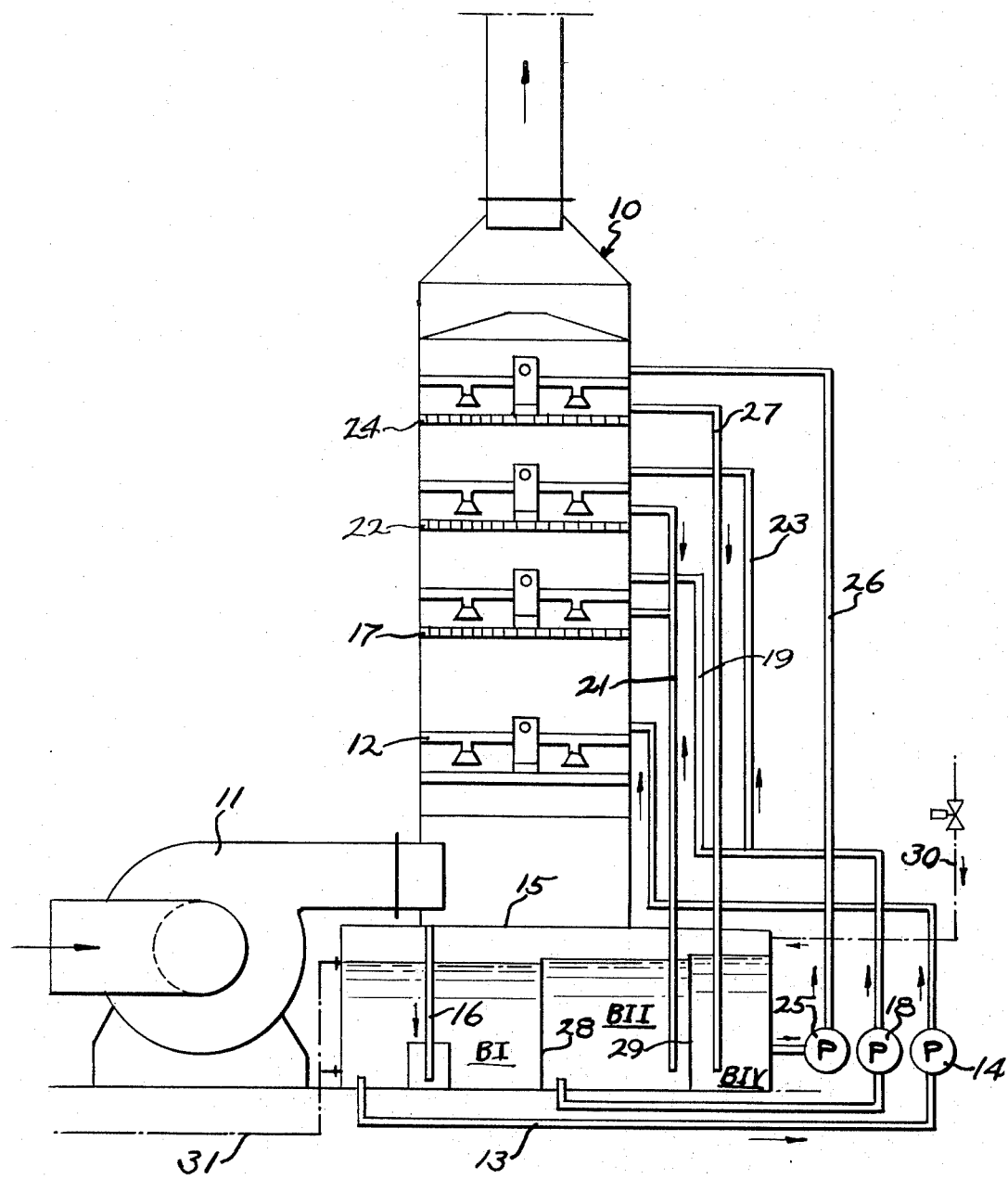

GAS-LIQUID CONTACT DEVICE

This is a continuation of application Ser. No. 132,417 filed Apr. 8, 1971 and now abandoned.

BACKGROUND OF THE INVENTION

It is well known to construct a step-type gas scrubber with scrubbing platforms arranged one above the other. The platforms have a liquid level of pre-determined height which is penetrated from beneath by a gas, a vapor, or a mixture of gas and vapor which flows through mesh holes. The pressure of the gas prevents the liquid from flowing downwardly through the holes. The mesh bottom, in this case, is formed as bundled capillary tubes, with an inside diameter of 0.1 to 0.3 mm, but preferably 0.3 to 0.9 mm. The capillary tubes are made from plastics and are glued or welded vertically and close to each other at the outside so that they form flat plates and the ends of the tubes lie in the upper surface of the plate and the under surface of the plate.

These step-type gas scrubbers have been found useful as gas and vapor scrubbing devices for many production and working procedures where flue gases and vapors are created which contain damaging or polluting substances, such as acid and strong corrosive constituents.

This invention concerns itself with a further extension of the step-type scrubber as a regenerative sorbing device, that is to say, a sorbing device which will permit the use of removed media, taken from the gases or vapors, for renewed production. This regeneration requires that these extracted media are re-introduced in a sufficient concentration to permit an economical re-use, or a correspondingly continuous recirculation of the absorbing liquid. In both cases, the danger exists that, before achieving the re-usable concentration, impermissably high concentrations are emitted to the atmosphere through the vapor pressure of the sorption. According to this invention, these concentrations, which cannot be achieved in a one-step process, are achieved in such a way that the gas together with the sorbing media is blown into the lower scrubbing elevation by a fan. The sorption media used in this scrubbing step is guided into a first storage container. The following scrubbing elevations, loaded with absorbing or adsorbing media, are arranged one above the other and are guided each into a separate storage container where sorbing media of lower concentration (achieved within the individual scrubbing elevations by transfer into scrubbing elevations of higher concentrations) are concentrated until re-used. Depending on the properties of the treated gaseous media and the sorbing media, several scrubbing elevations can be switched into parallel flow to a common storage container. Finally, it is possible to have scrubbing processes independent of each other within the individual scrubbing elevations and within separate circulation circuits, where different reactions can follow indivually and one after the other within the same scrubber elevation. These and other difficulties experienced with the prior art devices have been obviated in a novel manner by the present invention.

It is, therefore, an outstanding object of the invention to provide a gas scrubber capable of providing an unusually high concentration of sorbed materials in the sorption medium.

It is another object of the invention to provide a gas scrubber capable of flexible operation to permit adjustment of the parameters to meet various conditions of operation.

With these and other objects in view, as will be apparent to those skilled in the art, the invention resides in the combination of parts set forth in the specification and covered by the claims appended hereto.

SUMMARY OF THE INVENTION

In general, the invention consists of a gas scrubber having a plurality of vertically-arranged trays having mesh holes and each supporting a body of sorption material. Gas to be cleaned is forced upwardly through successive trays and then exhausted. The trays are drained to separate containers and supplied from containers of various concentrations of absorbed material in sorption medium.

BRIEF DESCRIPTION OF THE DRAWINGS

The character of the invention, however, may be best understood by reference to one of its structural forms, as illustrated by the accompanying drawing, in which:

The FIGURE of the drawings shows a gas scrubber constructed in accordance with the principles of the present invention.

DESCRIPTION OF THE PREFERRED EMBODIMENT

Referring to the drawing, the gas scrubber, indicated generally by the reference numeral 10, is shown as having a fan 11. The gaseous medium to be treated is sucked into the inlet of fan 11 and is blown into a space underneath the bottom of scrubber elevation 12 by the fan 11. The gaseous medium penetrates the bottom of this scrubber elevation to which the absorbing or adsorbing media is introduced from storage container BI through a pipe line 13 and a pump 14. The media originally arrives at the container BI through an inlet pipe 30. The compound with the absorbing media, obtained with this pre-scrubbing elevation, is collected on the bottom 15 and runs back to the storage container BI thorough a drain line 16. Within the next scrubber elevation 17, a capillary bottom is provided by which means the sorbing liquid stays on the bottom during the whole scrubbing operation and only a little leakage takes place. Circulation takes place by means of a pump 18 and the inlet is made through a pipe line 19. The back flow into the second storage container BII takes place through a pipe line 21. The next elevation, which is 22, is connected through a pipe 23 to the same storage container BII by the use of the same pump 18. The next and last elevation 24 is connected to the storage container BIV and the circulation is brought about by a pump 25 through a pipe line 26 as the feed pipe and the pipe line 27 as the drain line.

According to the preferred embodiment, the storage containers BI, BII, and BIV are separated from one another by overflow platens 28 and 29, respectively. Different concentrations can be created within the individual storage containers through the controlled feed of sorbing liquids, from light concentrations to higher concentrations and may be thinned out to the desired grade of concentrations. This is brought about in such a way that the concentrated liquid to be drawn off for reuse is within the storage container BI and from there may be drawn off through a pipe line 31.

The practical use of the step-type gas scrubber in the above described manner has shown that, based on a known concentration of inlet gas, experience values are available for the sizing of the overflow platens and the additions of fresh water mixtures, which permit the creation of desired concentrations within the storage container BI for withdrawal. In an installation designed for 10,000 cubic meters of gas flow per hour, with gases containing hydrochloric acid, it has been demonstrated that 200 liters per hour of 12 percent hydrochloric acid can be recovered. In installations in which the quantities and the entrance concentrations of the available gases are practically constant, corresponding sizing for the overflow and fresh water entrance are easily determined, so that the installation of automatic controls for the operational circuit may take place so that sorbing media of the necessary concentration is continuously guided back into the working process.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A gas scrubber for transferring a component from an upward moving gas stream, comprising a contact tower,
   a. a lower gas inlet in said tower,
   b. an upper gas outlet in said tower,
   c. a fan means located at said inlet for introducing the gas under pressure to said tower,
   d. a plurality of horizontal scrubbing stages located above the gas inlet including at least a lowermost stage and an upper stage, at least one stage including a plate formed of a plurality of vertical bundled capillary tubes having inside diameters of 0.1 to 0.3 mm., said tubes having opposite ends which lie in the upper and lower surface of said plate,
   e. a plurality of liquid storage tanks having different fluid levels in communication with each other and located below said lowermost stage,
   f. weir means separating said tanks from one another and so positioned as to be the only means by which liquid is transferred from one tank to a tank with a lower liquid level,
   g. means for continuously circulating the liquid between said tank of higher fluid level and said upper stage, and means for continuously circulating the liquid between said tank of lower liquid level and said lowermost stage.

* * * * *